United States Patent
Wright et al.

(10) Patent No.: US 11,398,901 B2
(45) Date of Patent: Jul. 26, 2022

(54) RESTRICTED PARTIAL KEY STORAGE

(71) Applicant: Walmart Apollo, LLC, Bentonville, AR (US)

(72) Inventors: Derrick Gene Wright, Springdale, AR (US); Oscar Blass, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/213,311

(22) Filed: Mar. 26, 2021

(65) Prior Publication Data

US 2021/0306139 A1  Sep. 30, 2021

Related U.S. Application Data

(60) Provisional application No. 63/000,117, filed on Mar. 26, 2020.

(51) Int. Cl.
*H04L 9/08* (2006.01)

(52) U.S. Cl.
CPC ........... *H04L 9/083* (2013.01); *H04L 9/0869* (2013.01); *H04L 9/0897* (2013.01)

(58) Field of Classification Search
CPC ..... H04L 9/083; H04L 9/0869; H04L 9/0897; H04L 9/085; H04L 9/0894; H04L 9/0836
USPC ........................................................ 380/279
See application file for complete search history.

(56) References Cited

U.S. PATENT DOCUMENTS

| | | | |
|---|---|---|---|
| 7,360,096 B2 * | 4/2008 | Bracewell | H04L 63/068 726/10 |
| 8,542,823 B1 | 9/2013 | Nguyen et al. | |
| 8,909,931 B2 | 12/2014 | Noda | |
| 2005/0195975 A1 * | 9/2005 | Kawakita | H04L 9/3236 380/30 |
| 2006/0282662 A1 * | 12/2006 | Whitcomb | H04L 63/0853 713/156 |
| 2008/0022132 A1 * | 1/2008 | Ellison | H04L 9/0836 713/193 |
| 2012/0140923 A1 * | 6/2012 | Lee | H04L 9/0894 380/44 |
| 2016/0080145 A1 * | 3/2016 | Day | H04L 9/0819 713/171 |
| 2020/0119917 A1 * | 4/2020 | Christensen | H04L 9/3255 |
| 2021/0319083 A1 * | 10/2021 | Bernardi | H04L 9/14 |

FOREIGN PATENT DOCUMENTS

WO  2018149110 A1  8/2018

* cited by examiner

*Primary Examiner* — Sanchit K Sarker

(57) ABSTRACT

Examples provide a system for managing access-restricted partial cryptographic keys for encrypting and decrypting data. In some examples, a slot server generates and stores a first partial key. The first partial key is access-restricted based on access control data. A slot value mapped to the storage location is returned to the client by the slot server. The client generates a second partial key which is stored at the client device with the slot value. To obtain the first partial key, the client sends a request to the slot server, including the slot value. The requesting client is validated using access control data. If the request comes from a validated client, the slot server provides the first partial key to the client. The first partial key and the second partial key are combinable to generate a composite key for encrypting and decrypting data.

20 Claims, 11 Drawing Sheets

RESTRICTED PARTIAL KEY STORAGE

BACKGROUND

A cryptographic key is typically used to encrypt sensitive data. Once encrypted, the data may be decrypted using the cryptographic key. Therefore, the cryptographic key itself becomes sensitive data which needs to be encrypted to prevent unauthorized access to the encrypted sensitive data. To encrypt this first cryptographic key, a second cryptographic key is created. The second cryptographic key is new sensitive data to be encrypted, creating an endless loop of sensitive data to be encrypted. This problem, which can be referred to as the password spiral of death, can result in user frustration, insufficient security for sensitive data, and burdensome manual cryptographic key management tasks for users.

SUMMARY

Some examples provide a system and method for managing restricted access split cryptographic keys. In some examples, a slot server receives a slot request from a user device. A key generator component generates a slot value mapped to a partial key storage location on a data storage device. A key manager component creates a key-slot portion of a composite key associated with access control data. A key storage component stores the key-slot portion of the composite key at the partial key storage location mapped to the partial key storage location and returns the slot value to the user device. The key-slot portion of the composite key is access restricted, such that the key-slot portion of the composite key is only distributed if a partial key distribution request including the slot value is received from a validated client. The client is validated using the access control data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
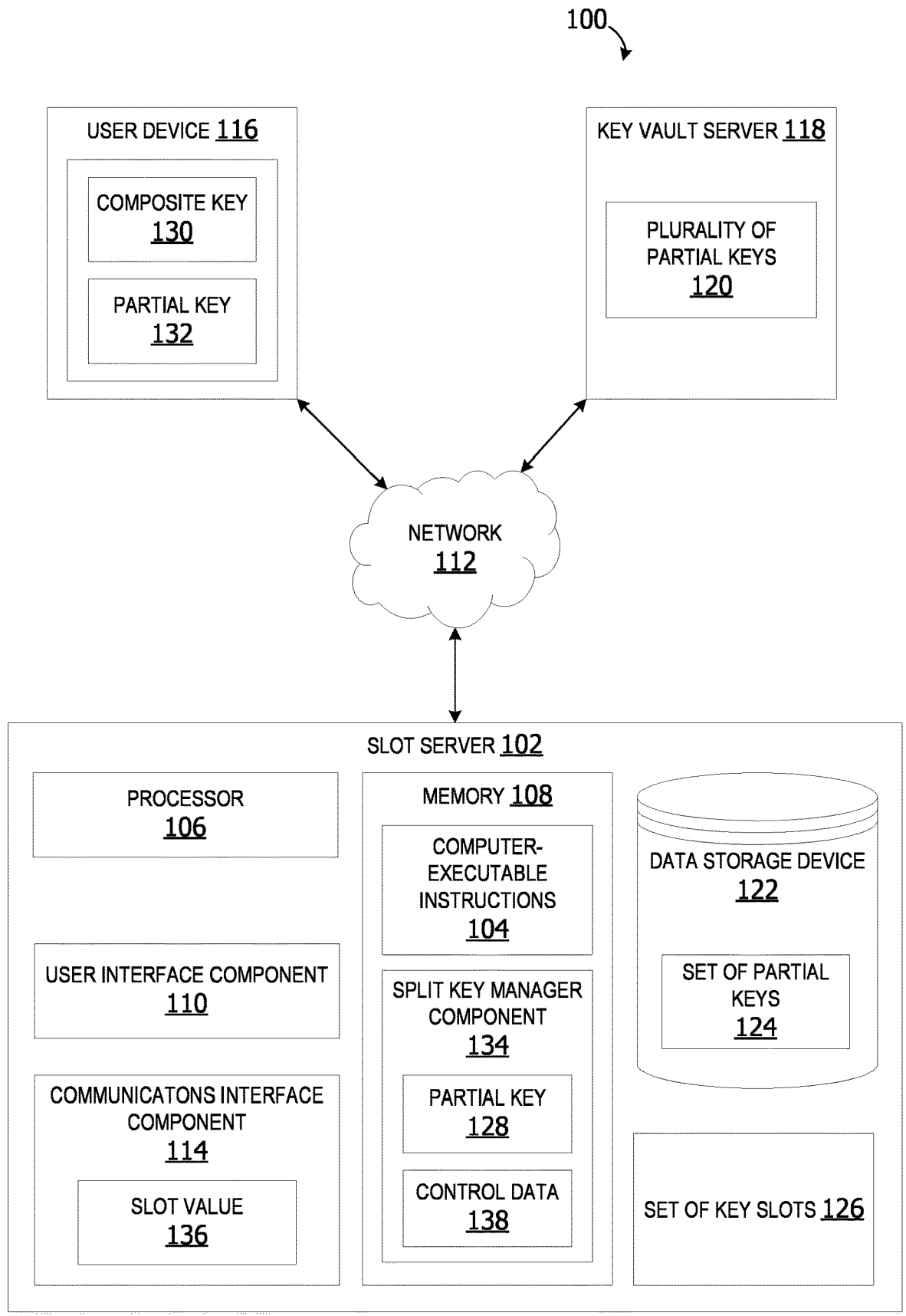
FIG. 1 is an exemplary block diagram illustrating a system for restricting access to portions of split cryptographic keys.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Typically, applications connect to databases, web services or other systems during their execution. Clients use credentials to connect to these systems. If these credentials are exposed to attackers then the data within them can lose integrity, availability, or confidentiality. Generally speaking, encryption is used to protect sensitive data. However, this creates a new secret that needs to be protected. If you protect that secret by encryption, it generates yet another secret. Some solutions utilize a password vault to manage credentials. Unfortunately, these vaults require keys to access them. If a user wants to encrypt the credentials, the user generates another key to store.

Referring to the figures, examples of the disclosure enable creation and management of access restricted partial keys for encrypting and decrypting data. In some examples, an internet protocol (IP) restricted partial key storage and retrieval is provided on a slot server. The slot server creates and stores one or more partial keys separately from a client user device which stores another partial key. Encrypted data on the client user device cannot be decrypted without both the client-side partial key and the partial key on the slot server. This improves security of encrypted data while providing additional protection for encryption keys.

Aspects of the disclosure further enable partial cryptographic key generation on a client user device. The client user device only stores part of the cryptographic key with the encrypted data. If the user device is accessed by unauthorized users, the encrypted data is safe as only a partial key is available on the client. The partial key cannot be used to decrypt the encrypted data. This improves security while minimizing the number of cryptographic keys stored on the user device. In addition, if the user device is compromised, there is insufficient data available on the user device to compromise the external system as the key for decrypting credentials for needed to access those external systems may not be decrypted using the partial key on the client.

Other examples provide a slot server which stores the second half of the cryptographic key. The client user device cannot decrypt the encrypted data without the second half of the key stored on the slot server. The slot server restricts access to this second key to an IP address or IP address range or other authentication methods such as an encrypted hardware ID identified in access control data associated with the client user device. If the slot server is compromised, there is insufficient data on the slot server to permit the unauthorized user to access other systems as no mapping between partial keys and clients is maintained on the slot server.

In other examples, the system splits cryptographic keys and stores the split keys on different systems to prevent storage of keys and encrypted data on the same system. This provides additional protection for encrypted data on the user device while restricting distribution of partial keys required for decrypting data to authorized IP addresses.

Still other examples restrict access to split keys based on access control data. The access control data includes one or more IP addresses or other uniquely identifying properties of the clients, such as, but not limited to, hardware ID that has been encrypted by the slot server's private key to prevent unauthorized access to keys stored on the slot server. In this manner, the slot server and user device is used in an unconventional way, and allows improved security, splitting cryptographic keys such that the entire composite key is not stored on one system, and restricting access based on IP address of clients or other mutually authenticated verification to improve security of encrypted data, thereby improving the functioning of the underlying computing device.

Referring again to FIG. 1, an exemplary block diagram illustrates a system 100 for restricting access to portions of split cryptographic keys. In the example of FIG. 1, the slot server 102 represents any device executing computer-executable instructions 104 (e.g., as application programs, operating system functionality, or both) to implement the operations and functionality associated with the slot server 102. The slot server 102, in some examples, includes a mobile computing device or any other portable device. A mobile computing device includes, for example but without limitation, a mobile telephone, laptop, tablet, computing pad, netbook, gaming device, and/or portable media player. The slot server 102 can also include less-portable devices such as servers, desktop personal computers, kiosks, or tabletop devices. Additionally, the slot server 102 can represent a group of processing units or other computing devices.

In some examples, the slot server 102 has at least one processor 106 and a memory 108. The slot server 102 in other examples includes a user interface component 110.

The processor 106 includes any quantity of processing units and is programmed to execute the computer-executable instructions 104. The computer-executable instructions 104 is performed by the processor 106, performed by multiple processors within the slot server 102 or performed by a processor external to the slot server 102. In some examples, the processor 106 is programmed to execute instructions such as those illustrated in the figures (e.g., FIG. 8, FIG. 9, FIG. 10, FIG. 11, and FIG. 12).

The slot server 102 further has one or more computer-readable media, such as the memory 108. The memory 108 includes any quantity of media associated with or accessible by the slot server 102. The memory 108 in these examples is internal to the slot server 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the slot server 102. The applications can communicate with counterpart applications or services such as web services accessible via a network 112. In an example, the applications represent downloaded client-side applications that correspond to server-side services executing in a cloud.

In other examples, the user interface component 110 includes a graphics card for displaying data to the user and receiving data from the user. The user interface component 110 can also include computer-executable instructions (e.g., a driver) for operating the graphics card. Further, the user interface component 110 can include a display (e.g., a touch screen display or natural user interface) and/or computer-executable instructions (e.g., a driver) for operating the display. The user interface component 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the slot server 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface component 114. The communications interface component 114 includes a network interface card and/or computer-executable instructions (e.g., a driver) for operating the network interface card. Communication between the slot server 102 and other devices, such as but not limited to a user device 116 and/or a key vault server 118, can occur using any protocol or mechanism over any wired or wireless connection. In some examples, the communications interface component 114 is operable with short range communication technologies such as by using near-field communication (NFC) tags.

The user device 116 represent any device executing computer-executable instructions. The user device 116 can be implemented as a mobile computing device, such as, but not limited to, a wearable computing device, a mobile telephone, laptop, tablet, computing pad, netbook, gaming device, and/or any other portable device. In other examples, the user device 116 is a less portable computing device, such as, but not limited to, a server, a desktop computer, a kiosk, or any other type of computing device. The user device 116 includes at least one processor and a memory. The user device 116 can also include a user interface component.

The key vault server 118 is a set of one or more computing devices, such as a server or data storage device, for storing a plurality of partial keys 120. A partial key is a cryptographic key or part of a cryptographic key which is combined or otherwise used with a client-generated portion of a composite key to encrypt or decrypt data. The key vault server 118 can be implemented as a physical server device or a cloud server.

A cloud server, in some examples, is a logical server providing services to the slot server 102 or other clients, such as, but not limited to, the user device 116. A cloud server is hosted and/or delivered via the network 112. In some non-limiting examples, the cloud server is associated with one or more physical servers in one or more data centers. In other examples, the cloud server is associated with a distributed network of servers.

The system 100 can optionally include a data storage device 122 for storing data, such as, but not limited to a set of one or more partial keys 124 stored in a set of one or more key slots 126. A partial key in the set of partial keys 124 is a key-slot portion of a composite key 130, such as, but not limited to, the partial key 128. The partial key is a string of digits or characters. In some examples, the partial key is a hash value. A key slot in the set of key slots 126 is a storage location on the data storage device 122 for storing a partial key.

The composite key 130 is a cryptographic key having a client-generated portion of the composite key 130 and a key-slot portion of the composite key 130. Both portions of the composite key are required to encrypt or decrypt data.

In some examples, the partial key 128 cannot be used to encrypt or decrypt data without another partial key created and stored on the user device 116, such as, but not limited to, the partial key 132. The partial key 132 in this example is the client-generated portion of the composite key 130. The partial key 128 is the key-slot portion of the composite key 130.

The data storage device 122 can include one or more different types of data storage devices, such as, for example, one or more rotating disks drives, one or more solid state drives (SSDs), and/or any other type of data storage device. The data storage device 122, in some non-limiting examples, includes a redundant array of independent disks (RAID) array. In other examples, the data storage device 122 includes a database.

The data storage device 122, in this example, is included within the slot server 102, attached to the computing device, plugged into the computing device, or otherwise associated with the slot server 102. In other examples, the data storage device 122 includes a remote data storage accessed by the computing device via the network 112, such as a remote data storage device, a data storage in a remote data center, or a cloud storage.

The memory 108, in some examples, stores one or more computer-executable components, such as, but not limited to, a split key manager component 134. In some non-limiting examples, the split key manager component 134 generates a slot value 136 mapped to a key slot (partial key storage location) on the data storage device 122 in response to receiving a slot request from the user device 116. The split key manager component 134 creates a partial key 128, which can be referred to as a key-slot portion of the composite key 130.

In other examples, the split key manager component 134 identifies and stores access control data 138 associated with the user device 116. The access control data 138 includes data to validate a client's user device. The access control data 138 can include, for example but without limitation, a hardware identifier (ID) associated with the user device, data for mutual authentication or a set of one or more IP addresses associated with the user device 116.

The access control data 138, in some examples, is a single IP address. In other non-limiting examples, the access control data 138 includes a range of IP addresses. In some non-limiting examples, the IP address is automatically detected by the slot server. In other examples, the IP address is a network range that is given as an argument.

In other examples, the slot server provides an algorithm to the client which is used by the client to create the hardware ID. The hardware ID is an identifier for the user device hardware, such as, but not limited to, the CPU. In other examples, the hardware ID can include an identifier for a virtual CPU.

In an example, the client utilizes the algorithm provided by the slot server to generate the hardware ID. The hardware ID is sent from the client user device to the slot server for utilization in validating the user device. The slot server, in some examples, encrypts the hardware ID using a public key and stores the encrypted hardware ID on the slot server. When a request for access to a partial key is received from a client, the slot server validates the client using the IP address, hardware ID or other mutual authentication to determine whether the requesting client should be permitted access to the partial key.

The split key manager component 134 stores the partial key 128 (key-slot portion of the composite key 130) at the partial key storage location on the data storage device 122 mapped to the slot value 136. The split key manager component 134 returns the slot value 136 to the user device 116 via the network 112. In some examples, a copy of the partial key 128 generated by the split key manager component 134 is also returned to the client user device 116.

The client utilizes the partial key 128 and the partial key 132 to encrypt data. Once encryption is complete, the client deletes the partial key 128 received from the split key manager component 134. In some non-limiting examples, the client stores the client-generated partial key 132, the slot value 136 mapped to the storage location of the slot server generated partial key 128 and the encrypted data on the user device 116 or a data store associated with the client. For example, the client can optionally store the encrypted data, the partial key 132 and/or the slot value 136 on a cloud storage, a remote data storage device, a flash memory, database, or any other type of data store associated with the client which is remote from the slot server 102.

In this manner, the client-generated partial key 132 is stored separately from the slot server generated partial key 128. The encrypted data on a data storage on the client or accessible by the client can only be decrypted with the composite key, which is composed of both the partial key 132 and the partial key 128. The composite key does not exist on the user device 116 or the slot server 102 except while the data is being encrypted on the user device 116. Once encryption is complete, the partial key 128 is deleted from the user device 116 ensuring that only part of the cryptographic key exists on the user device 116 and the slot server 102.

In some examples, when the client wants to decrypt the encrypted data on the user device 116, the client sends a request to the slot server 102 for distribution of the key-slot generated portion of the composite key. The split key manager component 134 distributes the partial key 128, which is only available on the slot server 102 if the slot server 102 receives the slot value 136 mapped to the correct data storage location storing the partial key 128. In other examples, the slot server 102 only distributes the partial key 128 to clients sending a partial key distribution request from an IP address identified in the access control data 138. This ensures the partial key 128 is only provided to authorized users.

In this example, the data is encrypted or decrypted on the user device 116 using the slot server generated portion of the composite key the user device received from the slot server and a client-generated portion of the composite key which is only known to the client. In other words, the client-generated partial key is generated and stored on the user device 116. The client-generated partial key is not shared or transmitted to the slot server 102.

In this example, the user device 116 stores the client-generated partial key 132. In other examples, the client-generated partial key 132 is stored on the key vault server 118. When the client is ready to encrypt or decrypt data, the client retrieves the client-generated partial key 132 from the key vault. The key vault may optionally also be used to store the slot value instead of the partial key. In other examples, the slot value and the partial key may be stored on the key vault.

Thus, half the composite key 130 s stored on the client and half the composite key is stored on the slot server 102. The composite key is not stored on one single device or in one single location. To decrypt the encrypted data, a user is required to retrieve the partial keys from two or more locations.

Figure 2:
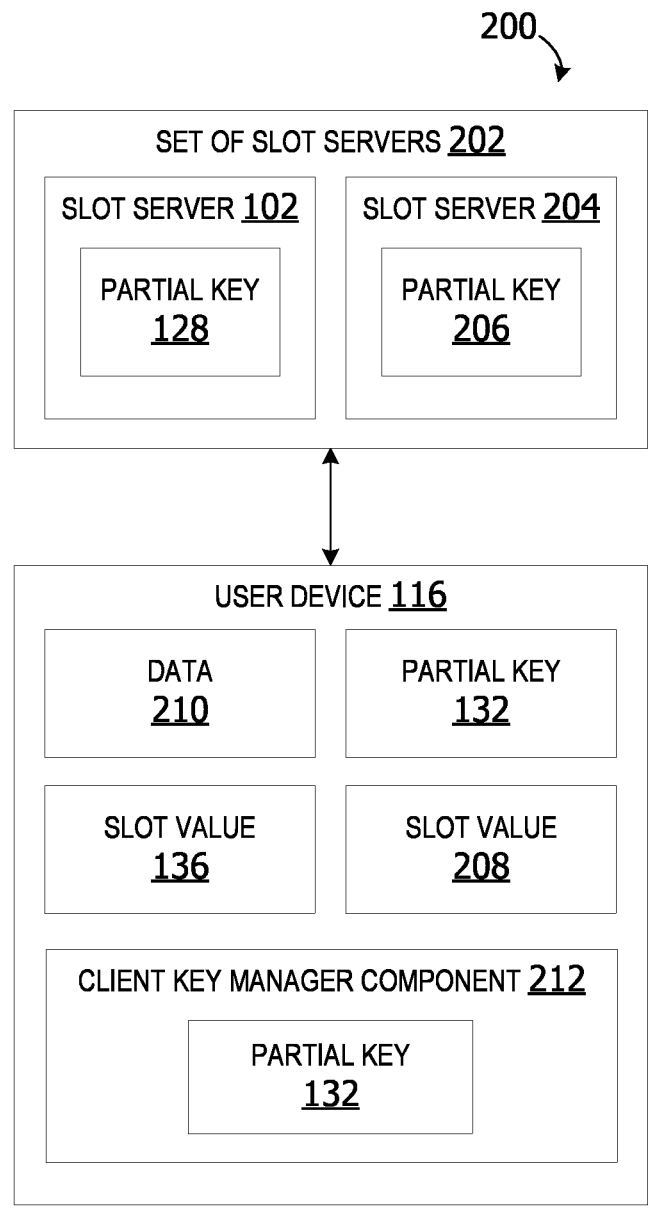
FIG. 2 is an exemplary block diagram illustrating a system for restricted access split cryptographic keys including a plurality of slot servers.

FIG. 2 is an exemplary block diagram illustrating a system 200 for restricted access split cryptographic keys including a plurality of slot servers. In some examples, a client key manager component 212 on the user device 116 generates a client-generated portion of a cryptographic key, which is the first partial key 132. The client sends a request to a set of one or more slot servers 202, including the slot server 102, for at least one key slot value.

In some examples, the slot server 102 generates the key-slot portion of the composite key, which is the second partial key 128. The slot server 102 stores the partial key 128 at a data storage location mapped to a slot value 136. The slot server 102 sends the partial key 128 and the slot value 136 to the user device 116 in response to the slot request received from the user device 116. The client uses the client-generated partial key 132 and the slot-server generated partial key 128 to encrypt the data 210. Once the data 210 is encrypted, the user device stores the partial key 132, the encrypted data 210 and the slot value 136. The user device 116 deletes the slot server generated partial key 128 from the user device 116 to ensure the entire composite key is unavailable on the user device 116.

In other examples, the client requests a slot value from both the slot server 102 and the slot server 204. The user device 116 generates the first partial key 132. The first slot server 102 generates the second partial key 128. The second slot server 204 generates the third partial key 206. The first slot server 102 returns the second partial key 128 and the slot value 136 to the user device 116. The second slot server 204 returns the partial key 206 and the slot value 208 to the user device 116. The user device 116 in these examples uses a composite key to encrypt the data 210 that is composed of the first partial key 132, the second partial key 128 and the third partial key 206. Once the data 210 is encrypted, the user device stores the partial key 132, the slot value 136 and the slot value 208. The user device 116 deletes the second partial key 128 and the third partial key 206 from the user device 116.

In this manner, the user device 116 only stores a part of the composite key. The encrypted data 210 cannot be encrypted using the partial key on the client. To decrypt the data, the user requests and obtains the second and third partial keys from the first and second slot servers.

In this example, the composite key includes a client-generated portion of the composite key and two key-slot portions generated by two different slot servers. However, the examples are not limited to utilizing three partial keys to encrypt or decrypt data. In other examples, the user device can utilize three or more key-slot portions of the composite key generated by three or more slot servers to encrypt or decrypt data.

Thus, in some examples, one third of the composite key is stored on the client, one third of the composite key is stored on the first slot server and one third of the composite key is stored on the second slot server. Portion of the composite key in this example are stored on three or more different computing devices or storage devices to further protect the encrypted data.

In still other examples, the client-generated partial key may be stored on a key vault server, with one third of the composite key on the first slot server and the other one third of the composite key on the second slot server. In these examples, the composite key is stored on three different devices while the slot values used to retrieve the split keys from the two slot servers are stored on the user device 116. In such examples, the information required to decrypt the encrypted data is stored among four different devices to add additional layers of security and protection for the data while minimizing the number of keys stored on the client device with the encrypted data.

Figure 3:
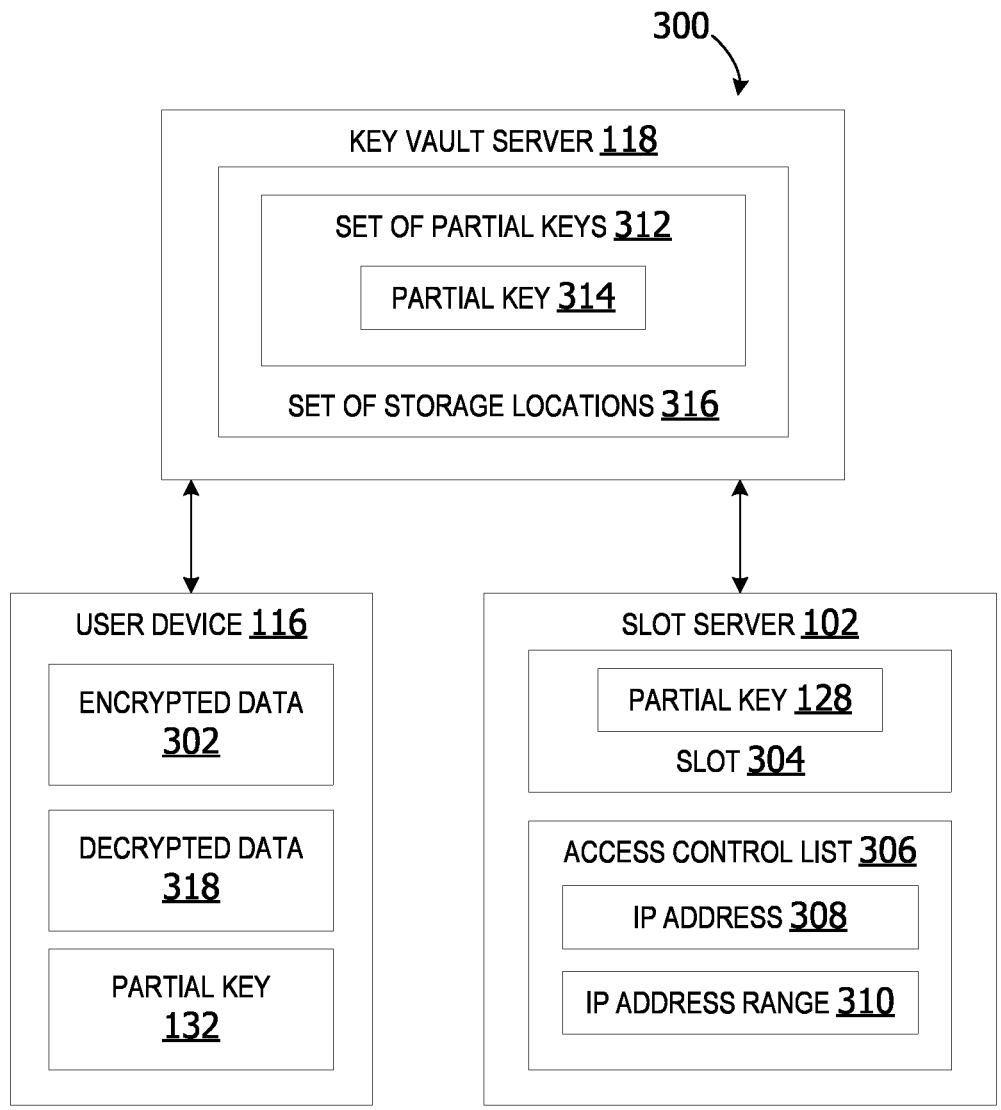
FIG. 3 is an exemplary block diagram illustrating a system for restricted access split cryptographic keys including a key vault.

FIG. 3 is an exemplary block diagram illustrating a system 300 for restricted access split cryptographic keys including the key vault server 118. In some examples, the user device 116 stores encrypted data 302 and the client-generated partial key 132. The client-generated partial key 132 is the client-generated portion of the composite key.

The slot server 102 stores the slot server generated partial key 128 in a slot 304. The slot 304 is a storage location on a data store. The slot server 102 utilizes access control data in an access control list 306 associated with each partial key on the slot server to restrict access to the key-slot portion of the composite key. The access control list 306 includes an IP address 308 or an IP address range 310.

In some examples, the client provides the IP address range 310 or other mutually authenticated mechanism with the slot request, such as, but not limited to, encrypted hardware ID. In other words, when the client requests a slot value, the client request includes the key generation algorithm being used by the client and the IP address range the client wants to authorize for access to the key-slot generated partial key.

In other examples, the key vault server 118 stores a set of partial keys 312, such as, but not limited to, the plurality of partial keys 120 in FIG. 1. The set of partial keys 312 includes one or more keys, such as the partial key 314 in a set of one or more storage locations 316. In some examples, the key vault server 118 stores the client-generated portion of the composite key, such as, but not limited to, the partial key 132. In other examples, the key vault server 118 may be used to store one or more key-slot portions of the composite key generated on a slot server.

The user device 116, in other examples, utilizes the client-generated portion of the composite key and the slot server generated portion of the composite key to un-encrypt the encrypted data 302 into decrypted data 318.

Figure 4:
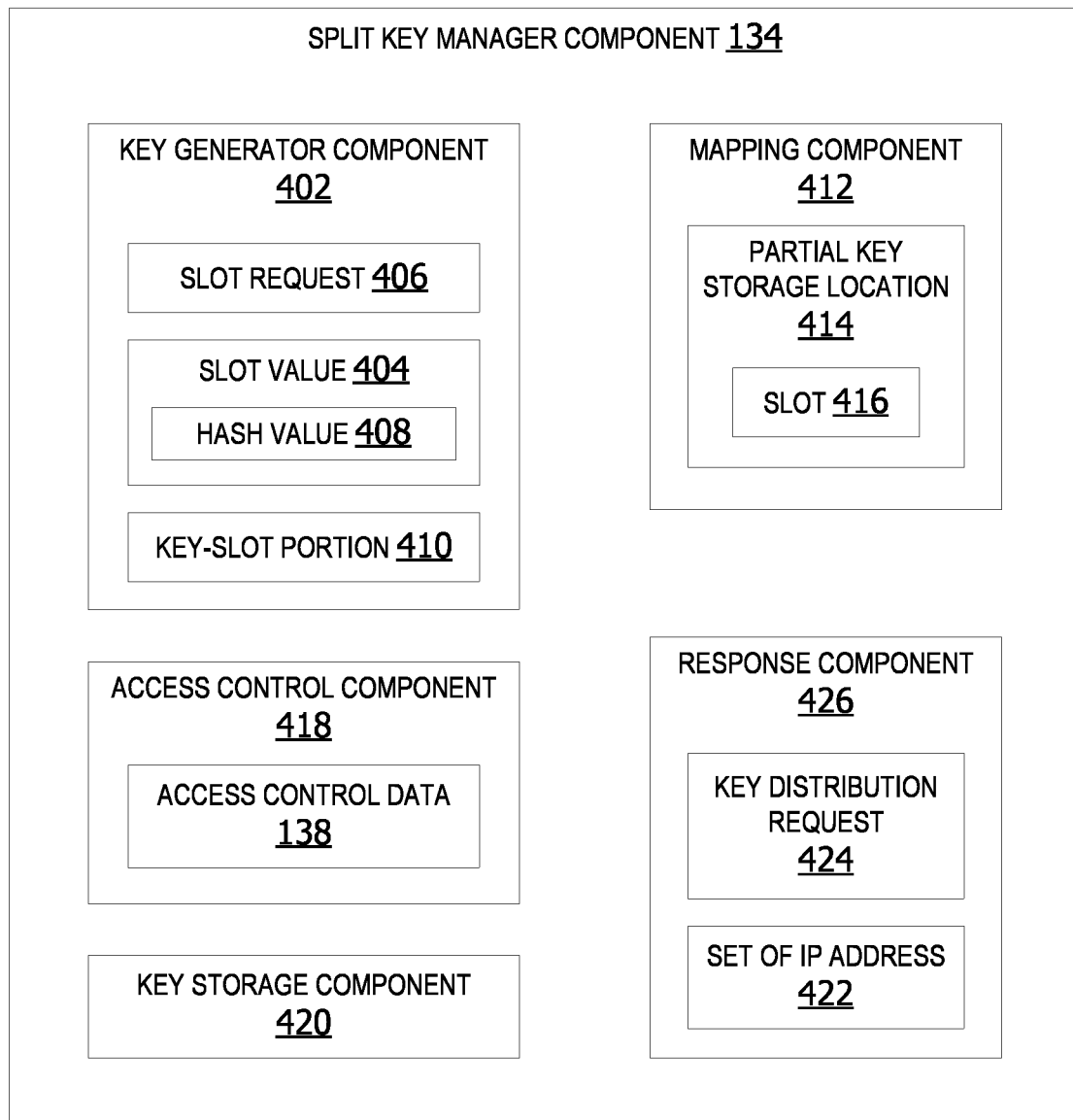
FIG. 4 is an exemplary block diagram illustrating a split key manager component associated with a slot server.

FIG. 4 is an exemplary block diagram illustrating a split key manager component 134 associated with a slot server, such as, but not limited to, the slot server 102 in FIG. 1. The split key manager component 134, in some examples, includes a key generator component 402 which generates a slot value 404 and a key-slot portion 410 of the composite key. The slot value 404 maps to a partial key storage location 414 on a data store associated with the slot server. In some examples, the slot value 404 is a random value, such as, but not limited to, a hash value 408. The slot value 404 is created in response to a slot request 406 received from a client, such as, but not limited to, the user device 116 in FIG. 1.

The key-slot portion 410 is a partial key generated by the slot server, such as, but not limited to, the partial key 128 in FIG. 1. The key generator component 402 generates the key-slot portion of the composite key using an algorithm. In some examples, the client instructs the slot server as to which algorithm to use in generating the key-slot portion of the composite key such that the client and slot server(s) use the same algorithm to generate all portions of the composite key. The algorithm used by the client to generate the client-generated portion of the composite key, in some examples, is included in the slot request 406 sent to the slot server by the client.

A key storage component 420, in some examples, stores the key-slot portion 410 of the composite key in a slot 416 associated with the partial key storage location 414 on a data storage device of the slot server.

A mapping component 412 maps the slot value 404 to the partial key storage location 414 address. In some examples, the mapping component populates a table with the slot value 404 mapped to an address of the slot 416 in which the key-slot portion 410 is stored.

An access control component 418 manages the access control data used to restrict distribution of the key-slot portion 410 of the composite key to user devices having an IP address in a set of one or more IP addresses 422 associated with the original slot request 406.

A response component 426 in some examples receives a key distribution request 424 from a client. The request includes the slot value 404 and a request that the slot server send the key-slot portion 410 of the composite key back to the client. If the request is received from an IP address in the set of IP addresses 422 identified in the access control data 138, the response component 426 returns the key-slot portion 410 to the client.

Figure 5:
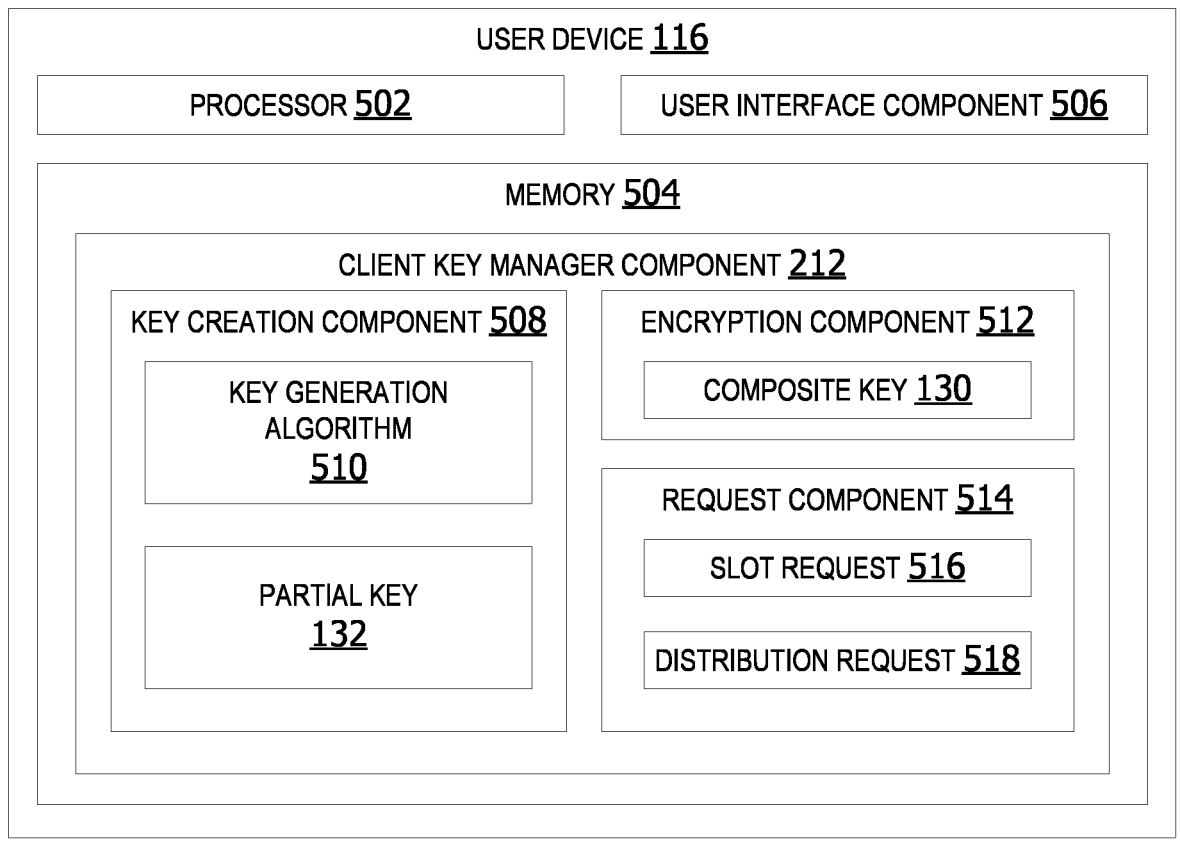
FIG. 5 is an exemplary block diagram illustrating a user device for encrypting and decrypting data using split cryptographic keys.

FIG. 5 is an exemplary block diagram illustrating a user device 116 for encrypting and decrypting data using split cryptographic keys. In some examples, the user device 116 includes one or more processors, such as the processor 502 and a memory 504. The user device 116 can also optionally include a user interface component 506.

The client key manager component 212 in some examples includes a key creation component 508. The key creation component 508, in some examples, uses a key generation algorithm 510 to generate the partial key 132. The partial key 132 is the client-generated portion of the composite key 130.

An encryption component 512 utilizes the composite key 130 to encrypt data or decrypt data. The composite key 130 is only present on the user device 116 while data is being encrypted or decrypted. When encryption or decryption is completed, the encryption component 512 deletes the key-slot portion of the composite key.

A request component 514 in some examples generates and sends the slot request 516 to the slot server to request a slot value and key-slot generated portion of the composite key. The request component 514, in other examples, generates and sends the distribution request 518 to the slot server requesting distribution of the key-slot generated portion of the composite key to the user device 116.

Figure 6:
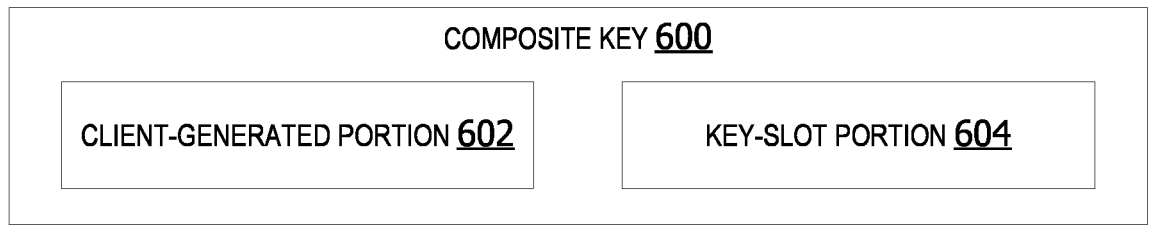
FIG. 6 is an exemplary block diagram illustrating a composite key.

FIG. 6 is an exemplary block diagram illustrating a composite key 600. The composite key 600 is a cryptographic key for encrypting and decrypting data by the client, such as, but not limited to, the composite key 130 in FIG. 1. The composite key 600 in this non-limiting example includes a client-generated portion 602 of the key and a key-slot portion 604 of the composite key 600.

Figure 7:
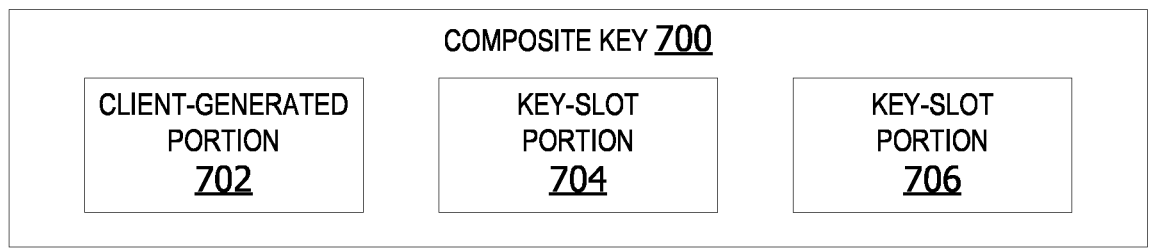
FIG. 7 is an exemplary block diagram illustrating a composite key including a plurality of key-slot portions.

FIG. 7 is an exemplary block diagram illustrating a composite key 700 including a plurality of key-slot portions. In this non-limiting example, the composite key 700 includes a client-generated portion 702 of the composite key 700, a first key-slot portion 704 of the composite key 700 generated by a first slot server and a second key-slot portion 706 of the composite key 700 generated by a second slot server.

Figure 8:
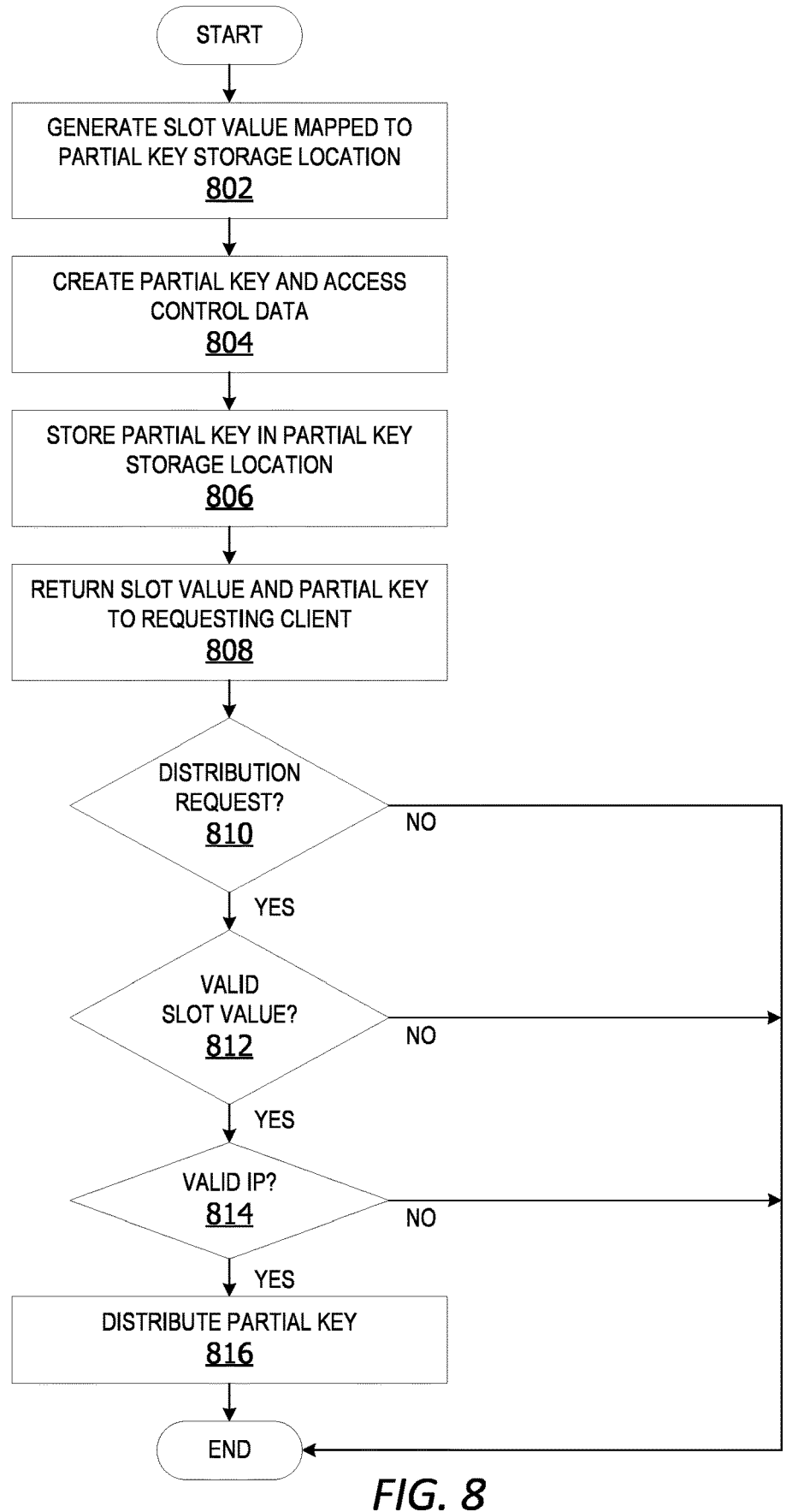
FIG. 8 is an exemplary flow chart illustrating operation of the computing device to manage restricted-access partial keys on a slot server.

FIG. 8 is an exemplary flow chart illustrating operation of the computing device to manage restricted-access partial keys on a slot server. The process shown in FIG. 8 is performed by a split-key manager component, executing on a computing device, such as the slot server 102 or the user device 116 in FIG. 1.

The process begins by generating a slot value mapped to a partial key storage location at 802. The partial key storage location is a storage space on a data store, such as, but not limited to, the data storage device 122 in FIG. 1. The split-key manager component of the slot server creates a partial key and access control data at 804. The access control data, in some examples, includes an IP address or IP address range associated with the client, such as, but not limited to, the set of IP addresses 422 in FIG. 4.

The split-key manager component stores the partial key in a partial key storage location at 806. The split-key manager component returns the slot value and the partial key to the requesting client at 808. A determination is made whether a distribution request is received at 810. If yes, a determination is made whether a valid slot value is provided with the request at 812. If yes, a determination is made whether the IP address is valid at 814. A valid IP address is an IP address included in the access control data mapped to the slot value. If the IP address is valid, the split-key manager component distributes the partial key to the requesting client at 816. The process terminates thereafter.

In this example, IP address is used to validate the client. In other examples, the client is validated using mutual authentication, hardware ID, IP address of the requesting client, and/or any other validation method. The validation methods may be used alone or in combination. Thus, a client can be validated based only on IP address or the client can be validated based on both IP address and hardware ID.

While the operations illustrated in FIG. 8 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 8.

Figure 9:
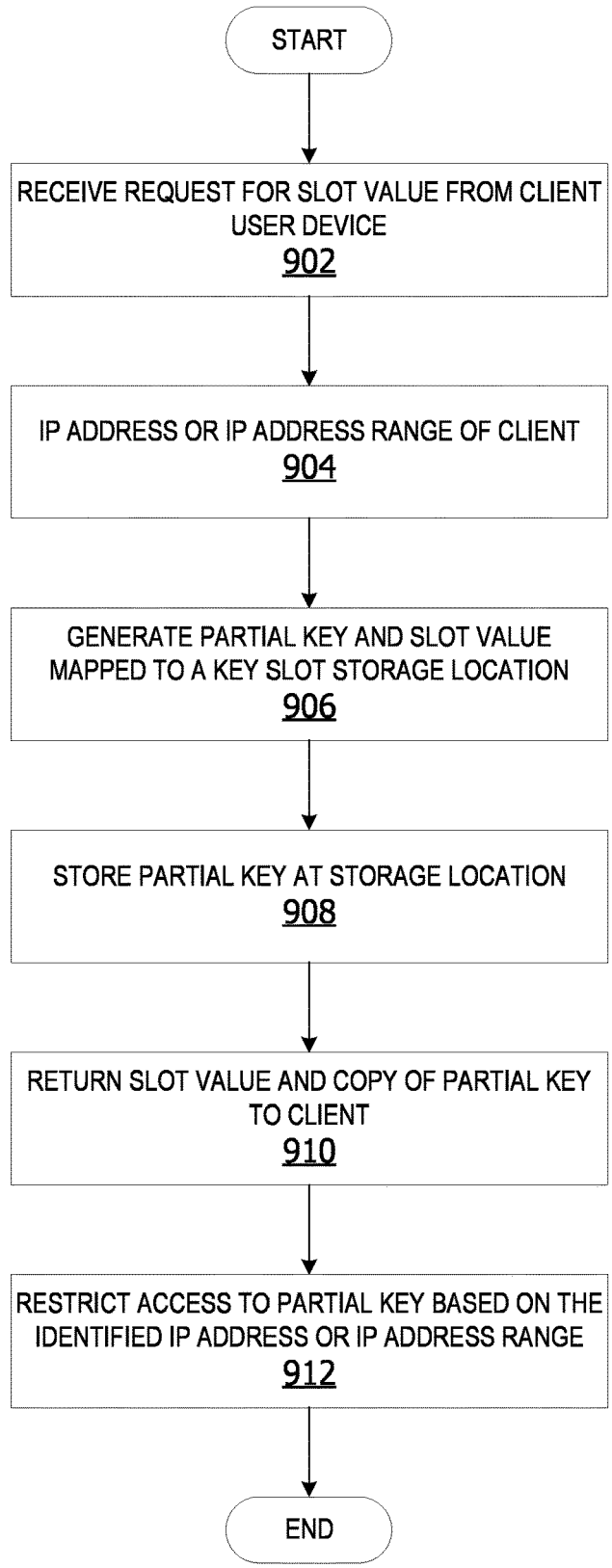
FIG. 9 is an exemplary flow chart illustrating operation of the computing device to generate restricted-access partial keys by a slot server.

FIG. 9 is an exemplary flow chart illustrating operation of the computing device to generate restricted-access partial keys by a slot server. The process shown in FIG. 9 is performed by a split-key manager component, executing on a computing device, such as the slot server 102 or the user device 116 in FIG. 1.

The process begins by receiving a request for a slot value from a client user device 902. The split-key manager component identifies an IP address or IP address range of the client at 904. The split-key manager component generates a partial key and slot value mapped to a key slot storage location at 906. The partial key is a key-slot generated portion of the composite key, such as, but not limited to, the partial key 128 in FIG. 1.

The split-key manager component stores partial key at storage location at 908. The split-key manager component returns slot value and copy of partial key to the client at 910. The split-key manager component restricts access to the partial key generated by the slot server based on the identified IP address or IP address range at 912. The process terminates thereafter.

While the operations illustrated in FIG. 9 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 9

Figure 10:
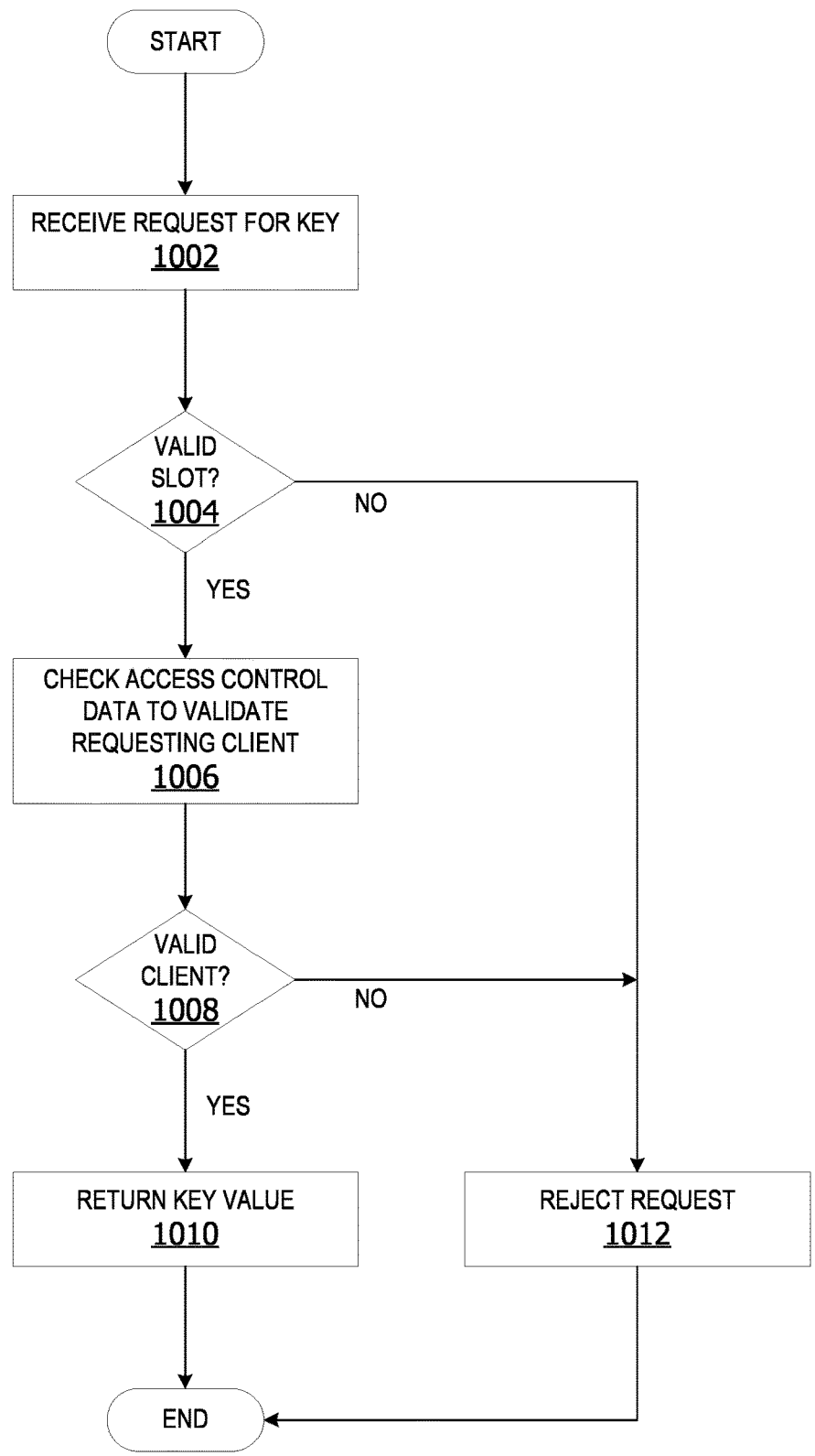
FIG. 10 is an exemplary flow chart illustrating operation of the computing device to respond to partial key distribution requests from clients.

FIG. 10 is an exemplary flow chart illustrating operation of the computing device to respond to partial key distribution requests from clients. The process shown in FIG. 10 is performed by a split-key manager component, executing on a computing device, such as the slot server 102 or the user device 116 in FIG. 1.

The process begins by receiving a request for a partial key from a requesting client at 1002. The split-key manager component determines if the request includes a valid slot value at 1004. If yes, the split-key manager component checks access control data to validate the requesting client at 1006. The requesting client can be validated based on the IP address of the client, the hardware ID of the client, via mutual authentication or any other type of client validation. The split-key manager component determines whether the requesting client is valid based on the access control data at 1008. If yes, the split-key manager component returns the partial key to the client at 1010. If the slot value provided by the client is not valid or the client is not validated based on access control data, the split-key manager component rejects the client request at 1012. The process terminates thereafter.

While the operations illustrated in FIG. 10 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 10.

Figure 11:
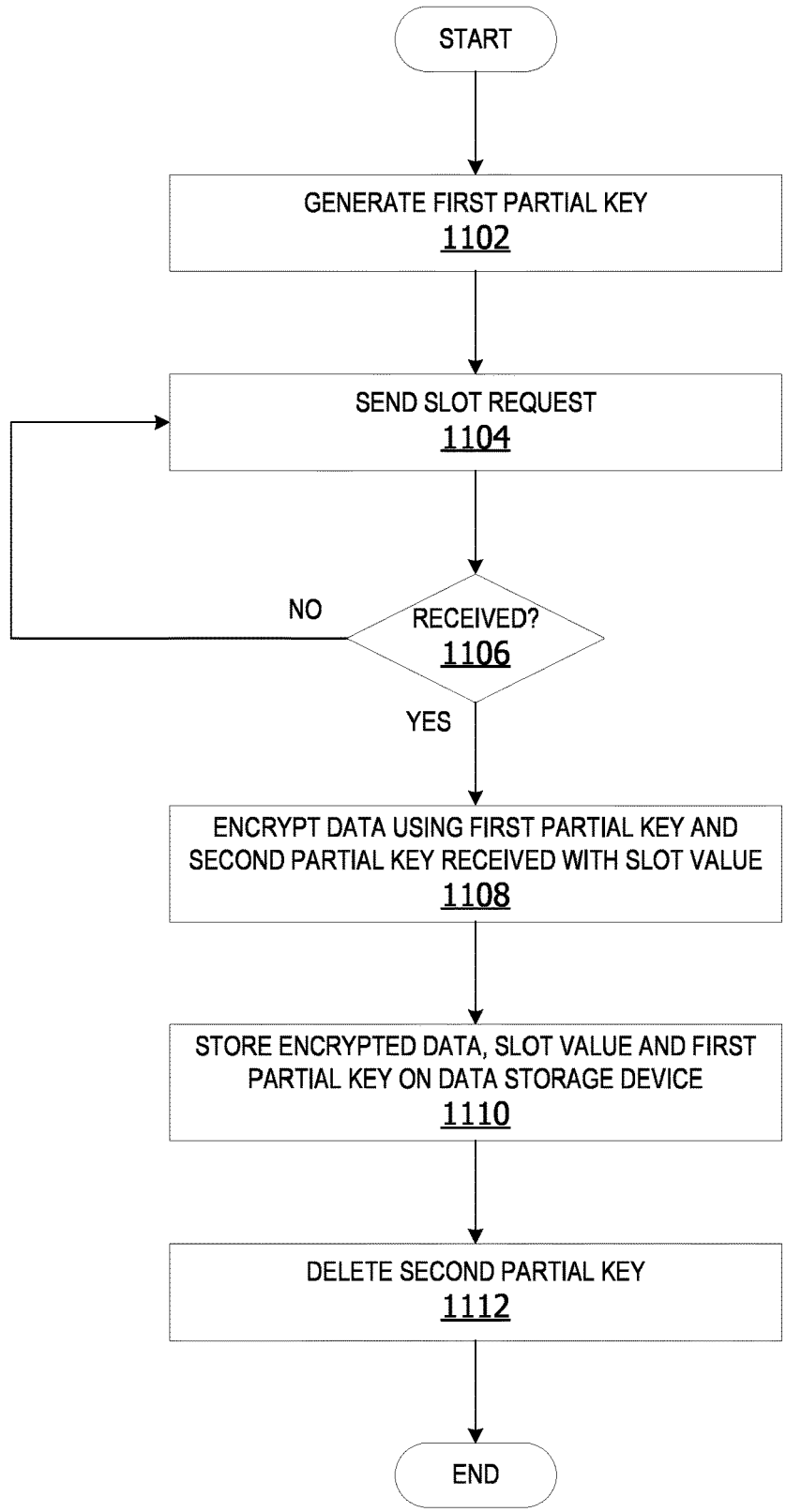
FIG. 11 is an exemplary flow chart illustrating operation of the computing device to request a partial key and slot value from a slot server for encrypting data on a client device.

FIG. 11 is an exemplary flow chart illustrating operation of the computing device to request a partial key and slot value from a slot server for encrypting data on a client device. The process shown in FIG. 11 is performed by a client key manager component, executing on a computing device, such as the slot server 102 or the user device 116 in FIG. 1.

The process begins by generating a first partial key at 1102. The partial key is a client-generated portion of the composite key, such as, but not limited to, the partial key 132 in FIG. 1. The client key manager component sends a slot request to the slot server at 1104. A determination is made whether a partial key and slot value is received from the slot server at 1106. If yes, the client key manager component encrypts the data using the first partial key generated by the client and the second partial key received with the slot value from the slot server at 1108. The client key manager component stores the encrypted data, slot value and the client-generated first partial key on the data storage device at 1110. The client key manager component deletes the second partial key generated by the slot server at 1112. The process terminates thereafter.

While the operations illustrated in FIG. 11 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 11.

Figure 12:
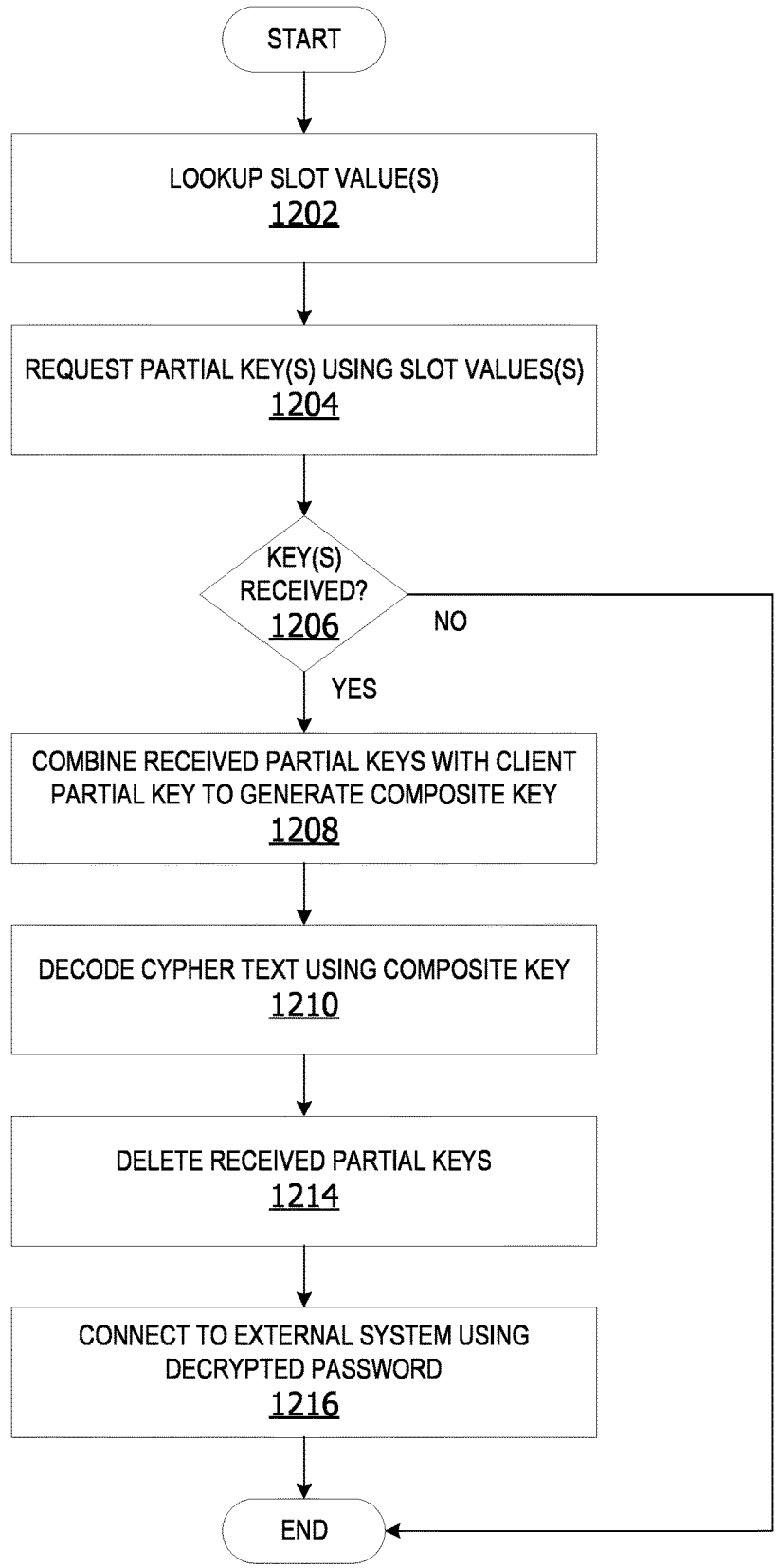
FIG. 12 is an exemplary flow chart illustrating operation of the computing device to request distribution of a restricted access partial key from a slot server for decrypting data.

FIG. 12 is an exemplary flow chart illustrating operation of the computing device to request distribution of a restricted access partial key from a slot server for decrypting data. The process shown in FIG. 12 is performed by a split-key manager component, executing on a computing device, such as the slot server 102 or the user device 116 in FIG. 1.

The process begins by looking up slot value(s) for partial keys at 1202. The client key manager component requests one or more partial key(s) from one or more slot servers using the one or more slot value(s) at 1204. The client key manager component determines if the partial key(s) are received from the one or more slot servers at 1206. If yes, the client key manager component combines the received partial keys with the client partial key to generate a composite key at 1208. The client key manager component decodes cypher text (encrypted data) using the composite key at 1210. The client key manager component deletes the key-slot generated partial keys received from the slot server(s) at 1214. When the key-slot portions of the composite key are deleted, the composite key is no longer available or present on the client. In other words, when the partial keys from the slot servers are deleted, the composite key is effectively also deleted. The client key manager component connects to the external system using the decrypted password at 1216. The process terminates thereafter.

While the operations illustrated in FIG. 12 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 12.

ADDITIONAL EXAMPLES

The system in some examples, includes a slot server that is not part of the application, database, or external system the client user device is attempting to accessing using sensitive data which needs to be protected and encrypted, such as a password or other credentials.

In other examples, a web service associated with the slot server generates a key-slot portion of a composite cryptographic key which is stored in a storage location, referred to as a slot. The storage location is mapped to a slot value.

The system in some examples consists of a slot server that stores part of the composite key needed to decrypt cipher text which only distributes part of the key to requesting clients associated with a computing device with the correct IP address or from computing devices in the correct network range.

In some examples, the slot server may be implemented as a cloud server. In still other examples, encrypted data or partial keys may be stored on clouds. In one examples, cloud systems such as AZURE™, ONEOPS™, or GOOGLE™ cloud platform (GCP) nodes may store partial keys and secrets for decrypting purposes. This enables improved scalability.

Alternatively, or in addition to the other examples described herein, examples include any combination of the following:

- an access control component, implemented on at least one processor, identifies the set of IP addresses associated with the client;
- the access control component generates the access control data including the IP address restricting distribution of at least one partial key to a network range of IP addresses included in the set of IP addresses;
- a mapping component, implemented on at least one processor, maps the access control data to the slot value;
- wherein the slot value is a random hash value;
- an access control component, implemented on at least one processor, compares at least one IP address or mutual authentication token associated with at least one user device requesting distribution of a partial key with the access control data;
- the response component distributes the partial key associated with the slot value to the at least one user device on condition the at least one IP address associated with the at least one user device matches at least one IP address or allowed hardware ID that is encrypted in the access control data;
- a first slot server generates a first key-slot portion of the composite key;
- a second slot server generates a second key-slot portion of the composite key;
- the user device generates a client-generated portion of the composite key, wherein the first key-slot portion of the composite key;
- the second key-slot portion of the composite key and the client-generated portion of the composite key are combined to form the composite key for encrypting or decrypting data;
- a first data storage device associated with a slot server configured to store a plurality of partial keys, including the key-slot portion of the composite key;
- a second data storage device associated with the user device, configured to store encrypted data, the slot value, and the client-generated portion of the composite key;
- a key vault server configured to store a plurality of partial keys associated with a plurality of slot values;
- a split-key manager component implemented on a user device, combines a set of key-slot portions of the composite key received from a set of slot servers with a client-generated portion of the composite key generated on the user device to form the composite key;
- wherein the composite key is utilized by the user device for encrypting or decrypting data;
- storing a plurality of partial keys generated by a slot server at a plurality of partial key storage locations on the data storage device;
- wherein each partial key in the plurality of partial keys comprising a key-slot portion of a composite key;
- receiving, by the user device, the slot value from a slot server during initialization of the user device;
- wherein the slot value is a random hash value;
- identifying, by an access control component, the set of IP addresses associated with the user device, wherein distribution of at least one partial key is restricted to a network range of IP addresses included in the set of IP addresses or mutually authenticated token such as a hardware ID that has been encrypted;
- mapping, by a mapping component, the access control data to the slot value;
- generating, by a first slot server, a first key-slot portion of the composite key;
- generating, by a second slot server, a second key-slot portion of the composite key;
- wherein the client-generated portion of the composite key, the first key-slot portion of the composite key, and the second key-slot portion of the composite key are combinable to generate the composite key for encrypting or decrypting data;
- creating, by a split-key manager component, the composite key by combining a set of key-slot portions of the composite key received from a set of slot servers with the client-generated portion of the composite key generated on the user device;
- storing a first partial key associated with the composite key on a key vault server;
- storing a second partial key associated with the composite key on a slot server;
- storing a third partial key associated with the composite key on the second data storage device associated with the user device, wherein the first partial key;
- wherein the second partial key and the third partial key are combinable to recreate the composite key for encrypting and decrypting data.

At least a portion of the functionality of the various elements in FIG. 1, FIG. 2, FIG. 3, FIG. 4, FIG. 5, FIG. 6, and FIG. 7 can be performed by other elements in FIG. 1, FIG. 2, FIG. 3, FIG. 4, FIG. 5, FIG. 6 and FIG. 7, or an entity (e.g., processor 106, web service, server, application program, computing device, etc.) not shown in FIG. 1, FIG. 2, FIG. 3, FIG. 4, FIG. 5, FIG. 6, and FIG. 7.

In some examples, the operations illustrated in FIG. 8, FIG. 9, FIG. 10, FIG. 11, and FIG. 12 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of managing restricted-access spit cryptographic keys, the method comprising generating, by a key generator component a slot value mapped to a partial key storage location on a data storage device responsive to receiving a slot request from a user device; creating, by a key generator component, a key-slot portion of a composite cryptographic key associated with access control data, the access control data identifying a set of IP addresses or allowed set of hardware IDs associated with the user device; storing, by a key storage component, the key-slot portion of the composite cryptographic key at the partial key storage location mapped to the partial key storage location; returning, by a communications interface component, the slot value to the user device via a network; and distributing, a response component, the key-slot portion of the composite key to at least one user device responsive to receiving a partial key distribution request including the slot value from an IP address within the set of IP address associated with the user device or a hardware ID.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for restricting access to split keys. For example, the elements illustrated in FIG. 1, FIG. 2, FIG. 3, FIG. 4, FIG. 5, FIG. 6 and FIG. 7, such as when encoded to perform the operations illustrated in FIG. 1, FIG. 2, FIG. 3, FIG. 4, FIG. 5, FIG. 6 and FIG. 7, constitute exemplary means for generating, by a key generator component a slot value mapped to a partial key storage location on a data storage device responsive to receiving a slot request from a user device; exemplary means for creating, by a key generator component, a key-slot portion of a composite cryptographic key associated with access control data, the access control data identifying a set of IP addresses associated with the user device; exemplary means for storing, by a key storage component, the key-slot portion of the composite cryptographic key at the partial key storage location mapped to the partial key storage location; exemplary means for returning, by a communications interface component, the slot value to the user device via a network; and exemplary means for distributing, a response component, the key-slot portion of the composite key to at least one user device responsive to receiving a partial key distribution request including the slot value from an IP address within the set of IP address associated with the user device or hardware ID associated with the client's user device.

Other non-limiting examples provide one or more computer storage devices having a first computer-executable instructions stored thereon for providing restricted-access split keys. When executed by a computer, the computer performs operations including generating, by a key generator component a slot value mapped to a partial key storage location on a data storage device responsive to receiving a slot request from a user device; creating, by a key generator component, a key-slot portion of a composite cryptographic key associated with access control data, the access control data identifying a set of IP addresses associated with the user device; storing, by a key storage component, the key-slot portion of the composite cryptographic key at the partial key storage location mapped to the partial key storage location; returning, by a communications interface component, the slot value to the user device via a network; and distributing, a response component, the key-slot portion of the composite key to at least one user device responsive to receiving a partial key distribution request including the slot value from an IP address within the set of IP address associated with the user device or client with the proper mutually authenticated hardware ID.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there can be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing restricted-access split cryptographic keys, the system comprising:
   at least one hardware processor communicatively coupled to a memory;
   a key generator component associated with a first slot server, implemented on at least one hardware processor, generates a slot value mapped to a partial key storage location on a data storage device responsive to receiving a slot request from a user device the key generator component creates a first key-slot portion of a composite key associated with access control data for validating the user device, wherein a second slot server generates a second key-slot portion of the composite key, and wherein the user device generates a client-generated portion of the composite key;
   a key storage component, implemented on at least one hardware processor, stores the first key-slot portion of the composite key at the partial key storage location mapped to the partial key storage location;
   a communications interface component, implemented on at least one hardware processor, returns the slot value to the user device via a network; and
   a response component, implemented on at least one hardware processor, distributes the first key-slot portion of the composite key to at least one user device responsive to receiving a partial key distribution request including the slot value from a validated user device, wherein the user device is validated based on the access control data, and wherein the first key-slot portion of the composite key, the second key-slot portion of the composite key, and the client-generated portion of the composite key are combined to form the composite key for encrypting or decrypting data.

2. The system of claim 1, further comprising:
   an access control component, implemented on at least one hardware processor, identifies a set of IP addresses associated with the user device;
   the access control component generates the access control data including the set of IP addresses, wherein the access control component restricts distribution of at least one partial key to a network range of IP addresses included in the set of IP addresses; and
   a mapping component, implemented on at least one hardware processor, maps the access control data to the slot value, wherein the slot value is a random hash value.

3. The system of claim 1, and further comprising:
   an access control component, implemented on at least one hardware processor, compares at least one IP address or hardware ID associated with at least one user device requesting distribution of a partial key with the access control data to validate the user device; and
   the response component distributes the partial key associated with the slot value to the user device on condition the at least one IP address or hardware ID associated with the at least one user device corresponds to the access control data.

4. The system of claim 1, wherein the user device receives the slot value from the first slot server during initialization of the user device.

5. The system of claim 1, further comprising:
   a first data storage device associated with a slot server configured to store a plurality of partial keys, including the first key-slot portion of the composite key; and
   a second data storage device associated with the user device, configured to store encrypted data, the slot value and the client-generated portion of the composite key.

6. The system of claim 1, further comprising:
   a key vault server configured to store a plurality of partial keys associated with a plurality of slot values.

7. The system of claim 1, further comprising:
   a split key manager component implemented on the user device combines a set of key-slot portions of the composite key received from a set of slot servers with a client-generated portion of the composite key generated on the user device to form the composite key, wherein the composite key is utilized by the user device for encrypting or decrypting data.

8. A computer-implemented method for restricting access to split cryptographic keys, the computer-implemented method comprising:
   generating, by a key generator component a slot value mapped to a partial key storage location on a data storage device responsive to receiving a slot request from a user device;
   creating, by the key generator component associated with a first slot server, a first key-slot portion of a composite key associated with access control data, wherein a second key-slot portion of the composite key is generated by a second slot server, and wherein a client-generated portion of the composite key is generated by the user device;
   storing, by a key storage component, the first key-slot portion of the composite key at the partial key storage location mapped to the partial key storage location;
   returning, by a communications interface component, the slot value to the user device via a network; and
   distributing, by a response component, the first key-slot portion of the composite key to the user device responsive to receiving a partial key distribution request including the slot value from a validated user device, wherein the user device is validated based on the access control data, wherein the first key-slot portion of the composite key, the second key-slot portion of the composite key and the client-generated portion of the composite key are combined to form the composite key for encrypting or decrypting data.

9. The computer-implemented method of claim 8, further comprising:
storing a plurality of partial keys generated by a slot server at a plurality of partial key storage locations on the data storage device, each partial key in the plurality of partial keys comprising a key-slot portion of a composite key.

10. The computer-implemented method of claim 8, further comprising:
receiving, by the user device, the slot value from the first slot server during initialization of the user device, wherein the slot value is a random hash value.

11. The computer-implemented method of claim 8, further comprising:
identifying, by an access control component, a set of IP addresses associated with the user device, wherein distribution of at least one partial key is restricted to a network range of IP addresses included in the set of IP addresses; and
mapping, by a mapping component, the access control data to the slot value, wherein the slot value is a random hash value.

12. The computer-implemented method of claim 8, further comprising:
comparing at least one IP address or hardware ID associated with the user device with the access control data to validate the user device; and
distributing the first key-slot portion associated with the slot value to the user device having the at least one IP address or hardware ID corresponding to the access control data.

13. The computer-implemented method of claim 8, further comprising:
creating, by a key creation component, the composite key by combining a set of key-slot portions of the composite key received from a set of slot servers with a client-generated portion of the composite key generated on the user device.

14. The computer-implemented method of claim 8, further comprising:
storing a second key-slot portion associated with the composite key on a key vault server, wherein the first key-slot portion is stored on a first data storage device associated with the first slot server;
and
storing a third key-slot portion associated with the composite key on a second data storage device associated with the user device, wherein the first key slot portion, the second key-slot portion and the third key-slot portion form the composite key for encrypting and decrypting the data.

15. A device for restricting access to split cryptographic keys comprising at least one memory storing computer-executable instructions that, when executed by a computer cause the computer to perform operations comprising:
generating, by a key generator component of a first slot server, a slot value mapped to a key storage location on a data storage device responsive to receiving a slot request from a user device;
creating, by the key generator component of the first slot server, a first key-slot portion of a composite key associated with access control data, wherein a second key-slot portion of the composite key is generated by a second slot server, and wherein a client-generated portion of the composite key is generated by the user device;
storing, by a key storage component, the first key-slot portion of the composite key at the key storage location mapped to the key storage location;
returning, by a communications interface component, the slot value to the user device via a network; and
distributing, by a response component, the first key-slot portion of the composite key to the user device responsive to receiving a key distribution request including the slot value from the user device, wherein the user device is a validated user device, wherein the user device is validated based on the access control data, wherein the first key-slot portion of the composite key, the second key-slot portion of the composite key, and the client-generated portion of the composite key are combined to form the composite key for encrypting or decrypting data.

16. The device of claim 15, wherein the computer-executable instructions, when further executed by the computer, causes the computer to perform operations comprising:
storing a plurality of partial keys generated by a slot server at a plurality of partial key storage locations on the data storage device, each partial key in the plurality of partial keys comprising a key-slot portion of a composite key.

17. The device of claim 15, wherein the computer-executable instructions, when further executed by the computer, causes the computer to perform operations comprising:
receiving, by the user device, the slot value from the first slot server during initialization of the user device, wherein the slot value is a random hash value.

18. The device of claim 15, wherein the computer-executable instructions, when further executed by the computer, causes the computer to perform operations comprising:
identifying a set of IP addresses associated with the user device based on the access control data; and
restricting distribution of at least one partial key to a network range of IP addresses included in the set of IP addresses.

19. The device of claim 15, wherein the computer-executable instructions, when further executed by the computer, causes the computer to perform operations comprising:
creating, by a key creation component, the composite key by combining a set of key-slot portions of the composite key received from a set of slot servers with the client-generated portion of the composite key generated on the user device.

20. The device of claim 15, wherein the computer-executable instructions, when further executed by the computer, causes the computer to perform operations comprising:
storing a second key-slot portion associated with the composite key on a key vault server, wherein the first key-slot portion associated with the composite key is stored on a first data storage device associated with the first slot server; and
storing a third key-slot portion associated with the composite key on a second data storage device associated with the user device, wherein the first key-slot portion, the second key-slot portion and the third key-slot portion form the composite key for encrypting and decrypting the data.

\* \* \* \* \*